Dec. 3, 1935. F. S. BELL 2,022,949
APPARATUS AND METHOD FOR FORMING CAPS FOR RECEPTACLES
Filed Feb. 1, 1933 9 Sheets-Sheet 2
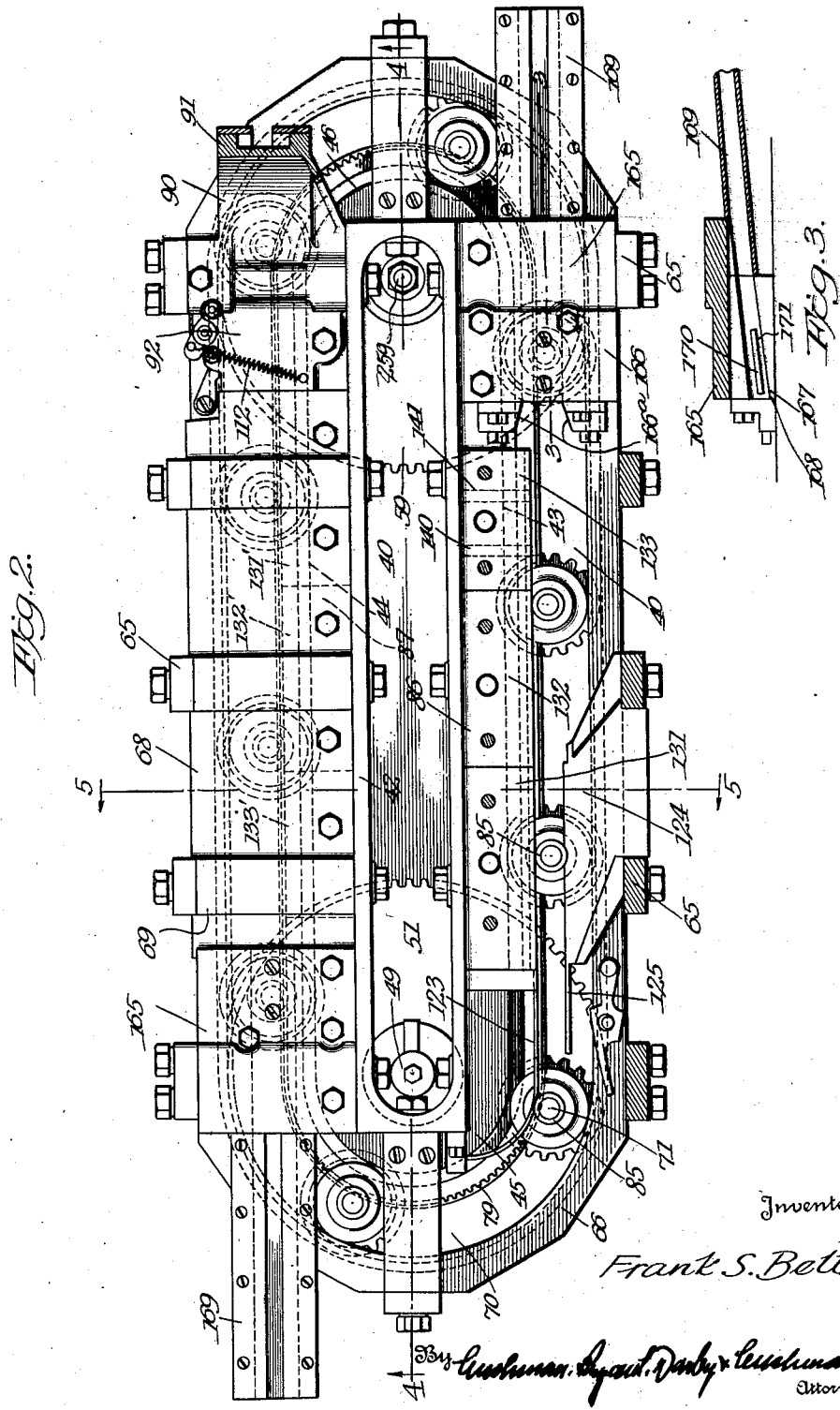
Inventor
Frank S. Bell.

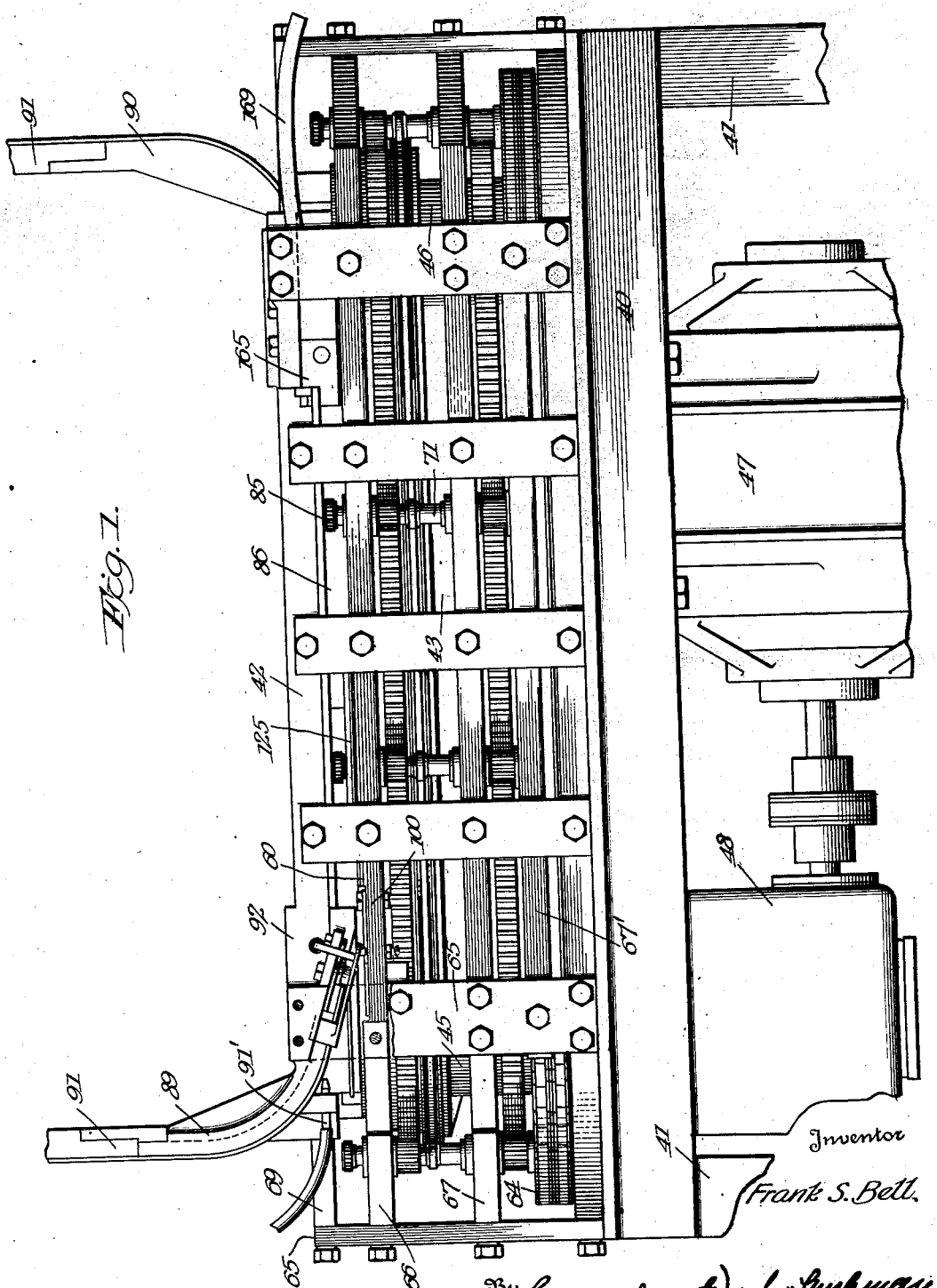

Dec. 3, 1935.  F. S. BELL  2,022,949
APPARATUS AND METHOD FOR FORMING CAPS FOR RECEPTACLES
Filed Feb. 1, 1933  9 Sheets-Sheet 3
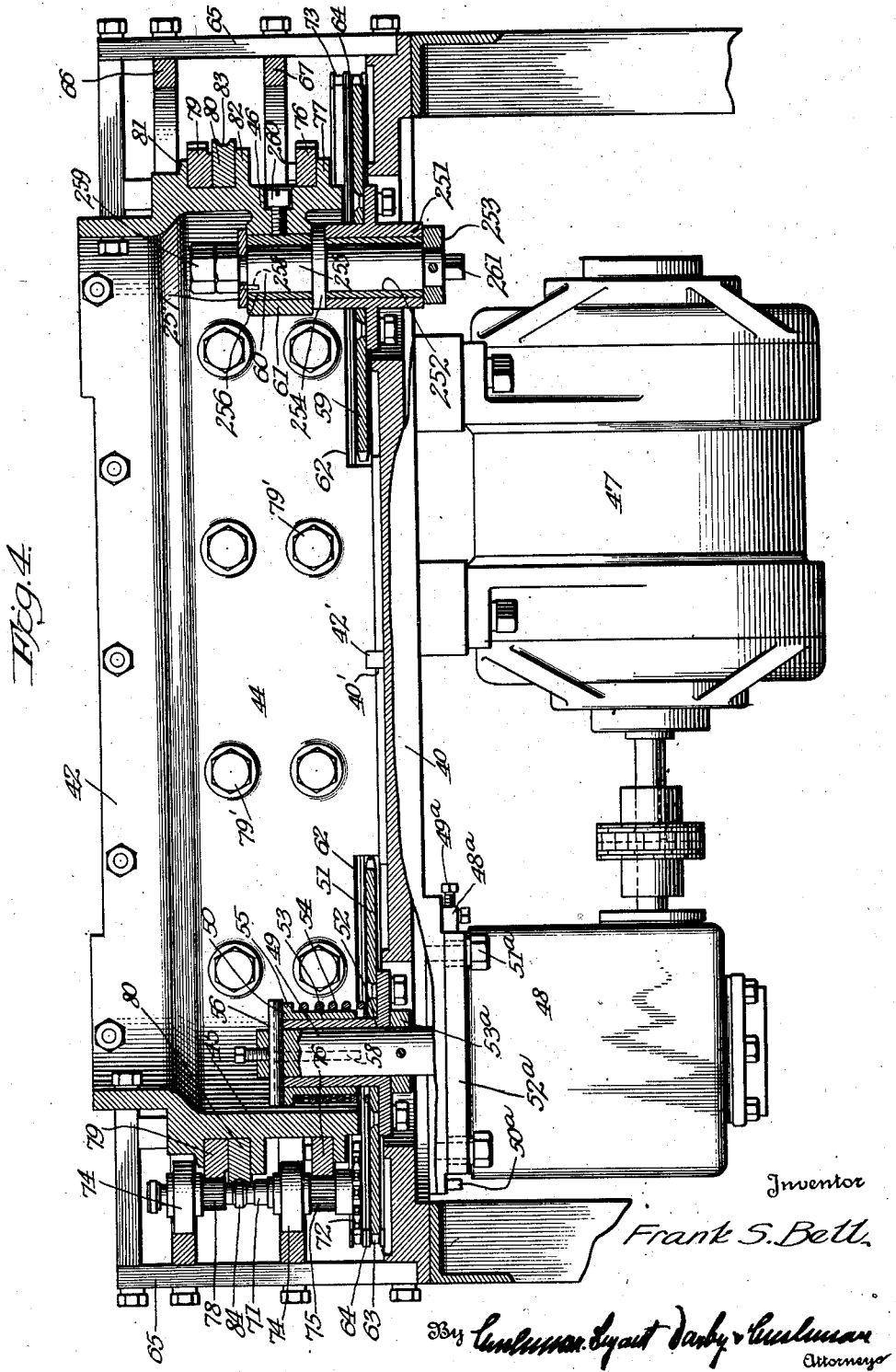

Dec. 3, 1935.　　　　F. S. BELL　　　　2,022,949
APPARATUS AND METHOD FOR FORMING CAPS FOR RECEPTACLES
Filed Feb. 1, 1933　　9 Sheets-Sheet 4

Inventor
Frank S. Bell

Dec. 3, 1935.     F. S. BELL     2,022,949
APPARATUS AND METHOD FOR FORMING CAPS FOR RECEPTACLES
Filed Feb. 1, 1933     9 Sheets-Sheet 5
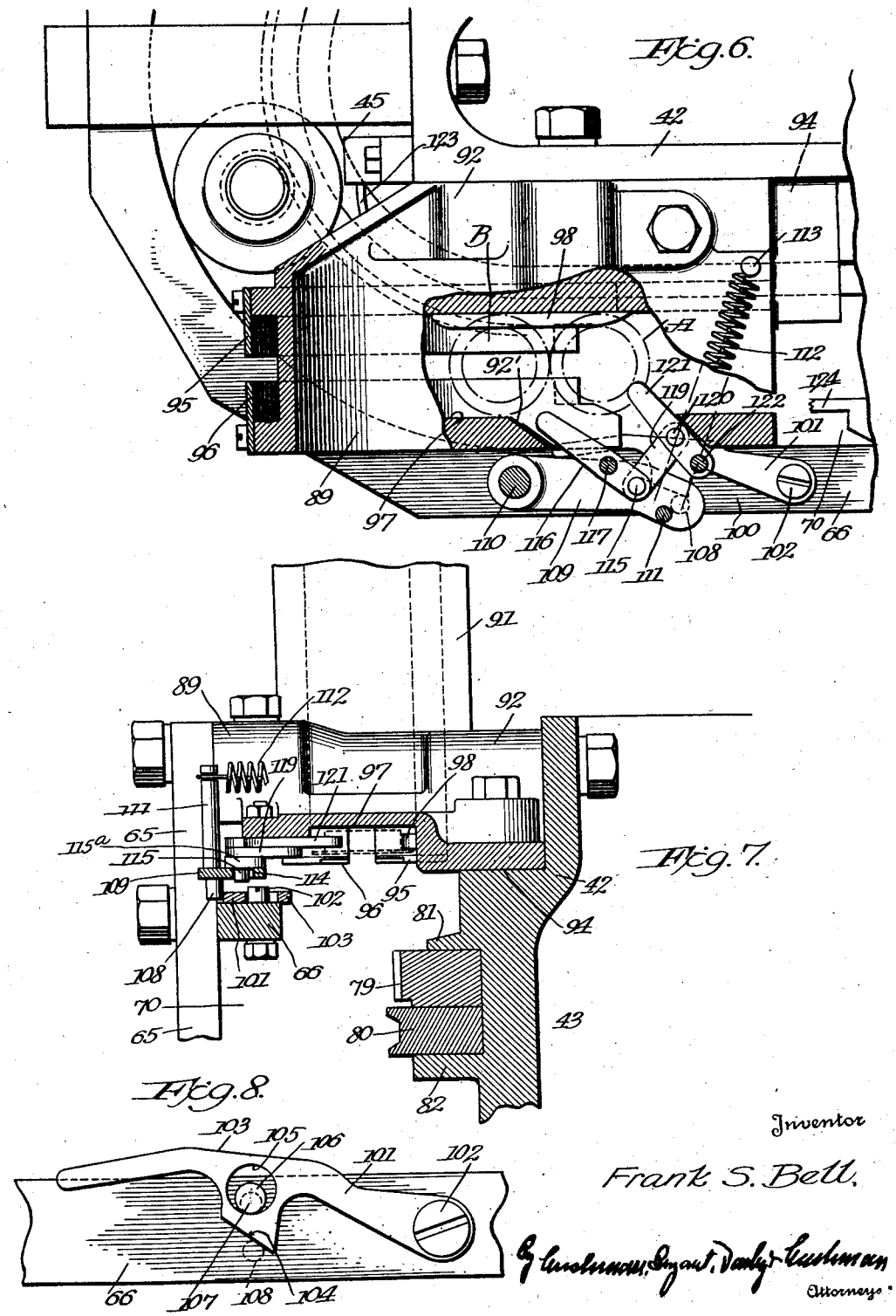

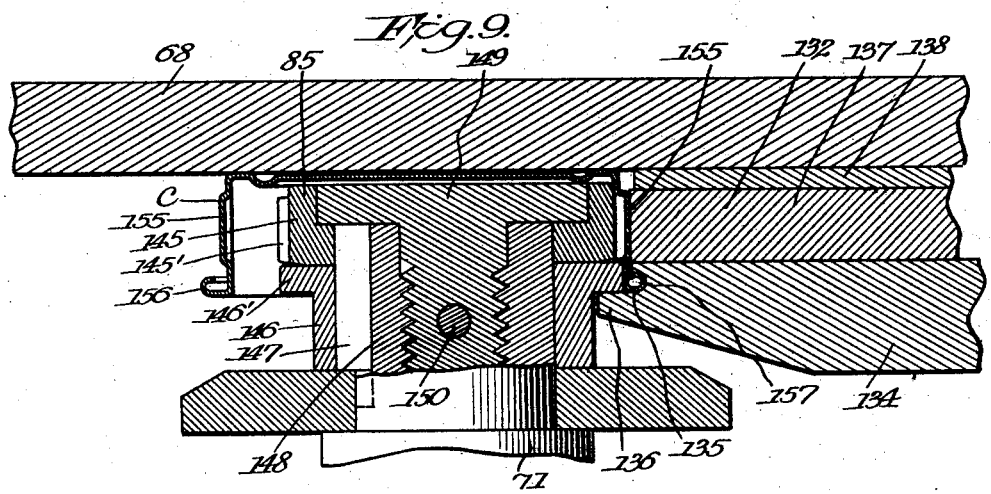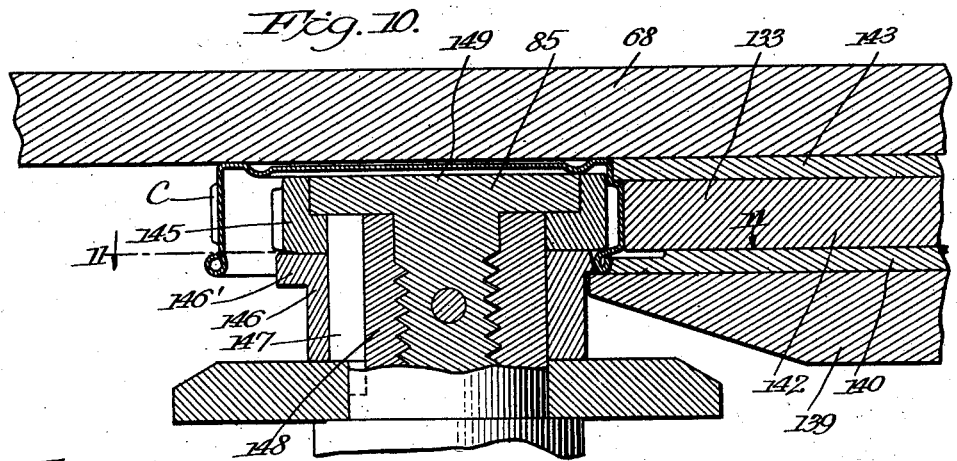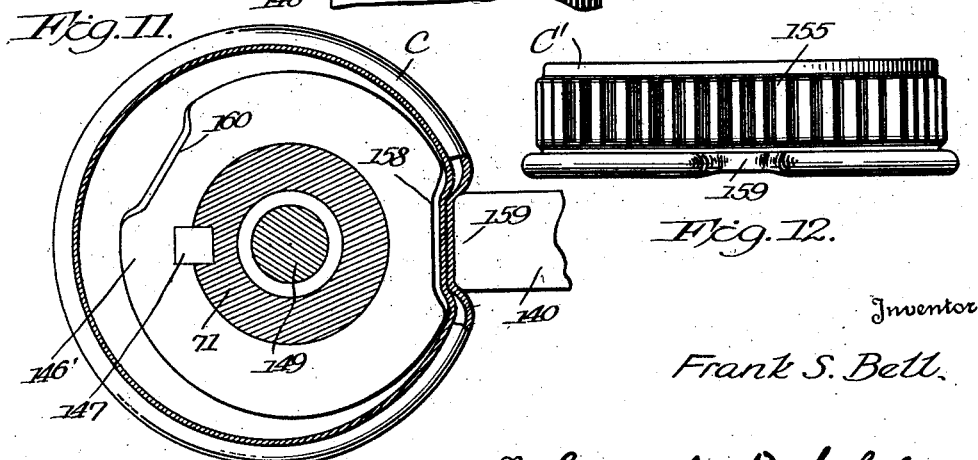

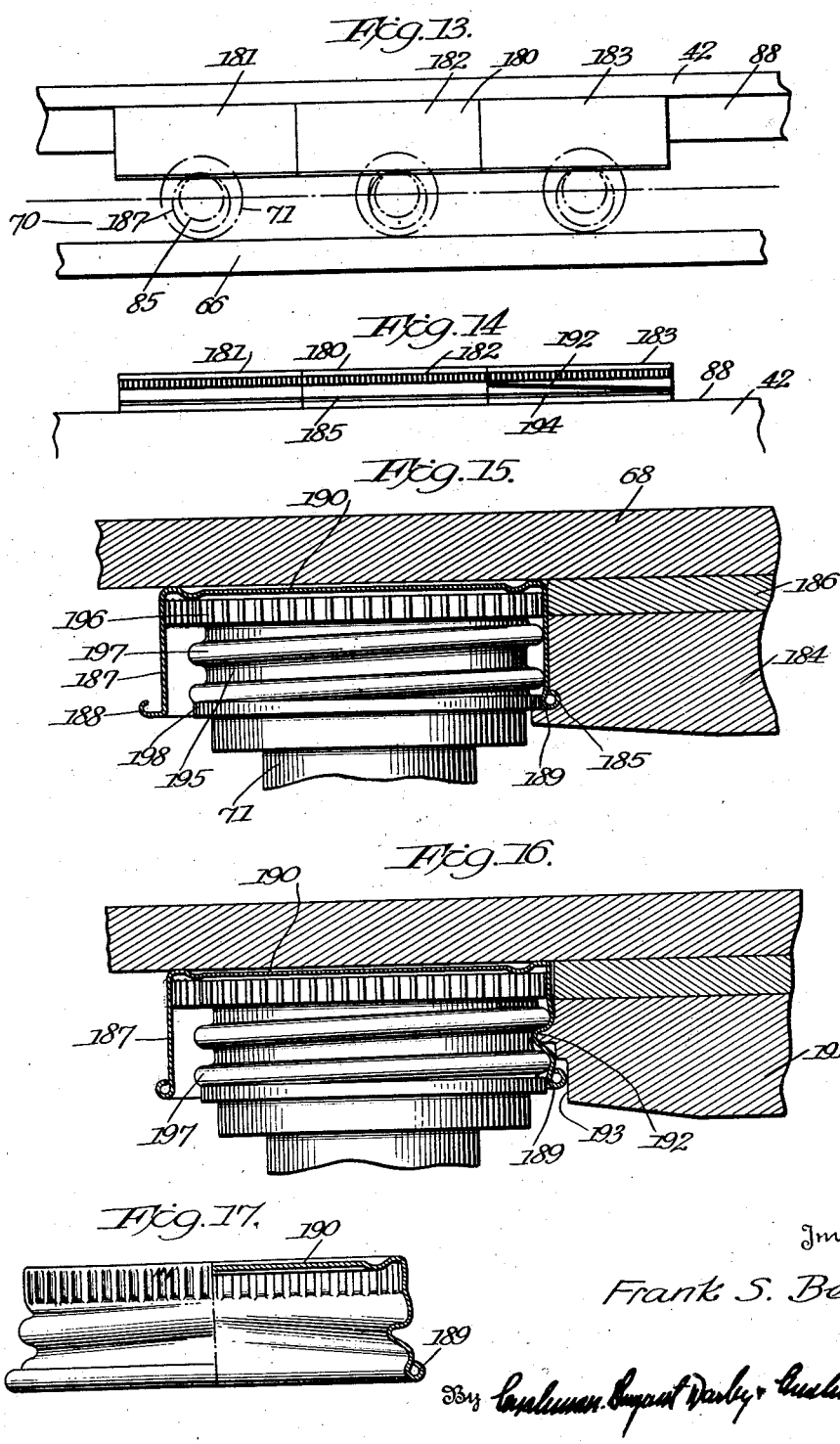

Dec. 3, 1935.    F. S. BELL    2,022,949
APPARATUS AND METHOD FOR FORMING CAPS FOR RECEPTACLES
Filed Feb. 1, 1933    9 Sheets-Sheet 8
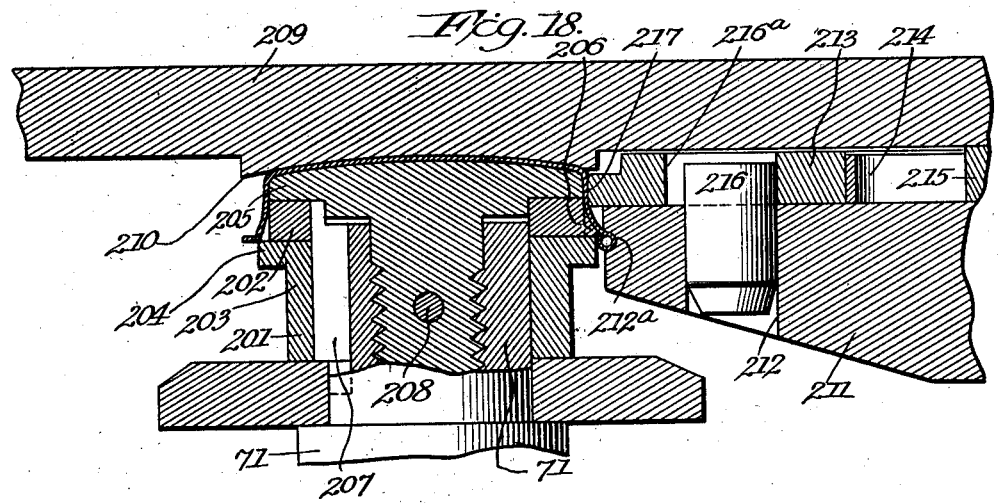
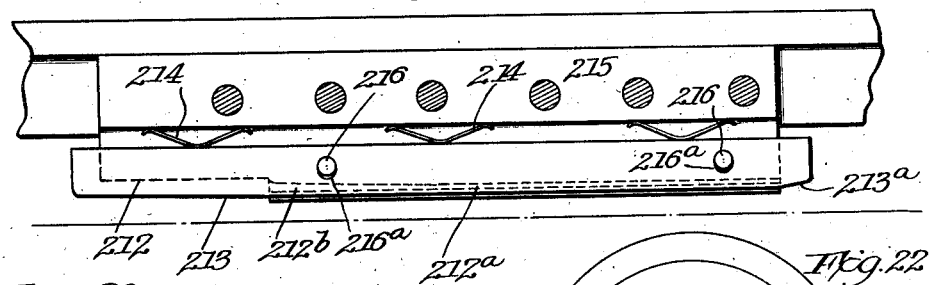
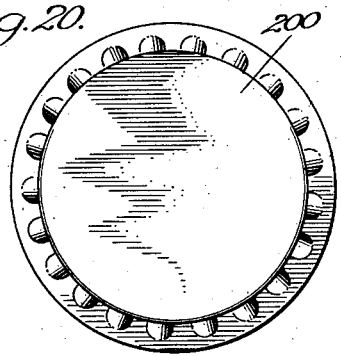
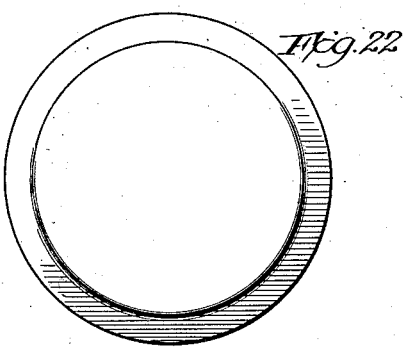
Inventor
Frank S. Bell
By Cushman, Bryant, Darby & Cushman
Attorneys Dec. 3, 1935. F. S. BELL 2,022,949
APPARATUS AND METHOD FOR FORMING CAPS FOR RECEPTACLES
Filed Feb. 1, 1933 9 Sheets-Sheet 9

Inventor
Frank S. Bell,

Patented Dec. 3, 1935

2,022,949

UNITED STATES PATENT OFFICE 2,022,949

APPARATUS AND METHOD FOR FORMING CAPS FOR RECEPTACLES

Frank S. Bell, Baltimore, Md., assignor to Crown Cork & Seal Company, Inc., Baltimore, Md., a corporation of New York Application February 1, 1933, Serial No. 654,750

72 Claims. (Cl. 153—72)

The present invention relates to an apparatus and method for forming caps for receptacles.

The principal object of the invention is to provide an apparatus and method for producing caps at a much higher speed than is possible by the apparatus and methods in use at the present time.

Another important object of the invention is to provide a process and apparatus for producing caps in such a manner that the finished caps will have no thin or weakened areas such as would induce cracking of the material or marring of the finish of the caps.

A further object of the invention is to provide a machine and dies therefor, by means of which the blank cap is shaped into finished form by what is, in effect, a folding of the metal as distinguished from the operations performed by machines now in use, which operations distend the metal and stretch and weaken the material. This object is accomplished by feeding an oversized blank to the machine and shrinking the blank while folding the material therein and without decreasing the thickness of the material.

The method and apparatus of my invention particularly relate to the formation of caps for receptacles during movement of the cap blank in a straight line or rectilinear direction, during which movement the cap blank is rotated in contact with a die.

My novel method and apparatus, in a more particular embodiment of the invention, comprise the movement of, and means to move, the cap blanks in opposite directions upon a mandrel or carrier preferably having an orbital path, the caps moving, while being rotated, along portions of this path and being caused to contact with a fixed die. The particular advantage of this method and apparatus resides in the fact that but one moving unit forms at least one cap during one direction of movement with respect to a fixed die and produces at least one other cap blank during its opposite or return movement when it is moving past a second fixed die. The method, therefore, results in the production of at least double the usual quantity of finished caps upon a single machine occupying an amount of floor space substantially equal to that of the usual machine.

Another object of the invention is to provide various types of cooperating dies, the respective types of cooperating dies being designed to form lugged, threaded and crown caps from either plain cup-shaped cap blanks or from cap blanks which have been preformed, i. e. previously partially formed to finished shape. In the following specification, it is to be understood that the term "cap blank" includes either plain or preformed cap blanks.

Lugged caps may be produced by means of one of the types of cooperating dies referred to above, these dies being formed to manufacture caps of this type at a high rate of production, the cooperating dies being so designed that the caps produced thereby will not be marred or improperly formed during their passage through the dies.

Threaded caps are formed by another type of cooperating dies, these dies being particularly designed to form a threaded cap wherein the thread is provided with a hook-shaped shelf of the type disclosed in the application of Eric B. Kramer, Serial No. 552,494, filed July 22, 1931. Caps of this type may be formed by the dies of my invention at a maximum rate of production and with a minimum possibility of malformation of the caps.

Crown caps may be formed by a third type of cooperating dies included in my invention.

The crowning caps generally used by bottlers are formed with a rounded or convex top surface. The rounded top surface of the completed cap is preferably incorporated in the cap blank as an initial step in the process of forming the blank and it has heretofore been difficult to handle such a blank for the reason that the rounded top surface of the blank has caused the blank to have a rocking movement with respect to the cooperating dies by which the blank is subsequently acted upon to give it a finished form. In the form of cooperating dies included in the present invention, the dies are so designed that the cap blank can have no rocking movement with respect to the dies. The invention preferably includes a holding means, in addition to the cooperating dies, which will assist in holding the cap blank against any improper movement with respect to the dies.

In connection with the provision of cooperating dies for forming a crown cap, the invention also contemplates the provision of dies whereby a crown cap having a wired edge may be formed.

The lower edges of the skirts of crown caps are usually sharp and of relatively unfinished form. This sharp edge detracts from the appearance of the cap and occasionally results in injury to persons handling the cap blank. The skirts of caps of this type are sometimes distorted during the operation of prizing them from a container, particularly if the cap is formed of relatively thin metal. This results in distortion of the cap and prevents it from being replaced upon a partially filled bottle, or, if it can be replaced, the container is not properly sealed.

The dies of the present invention may include means to wire the lower edge of the skirt of a crown cap, thereby substantially improving its appearance and also reinforcing the lower edge and skirt of the cap. Since the wired edge reinforces the cap, the latter may be formed of relatively thin stock, thereby reducing the cost of production.

Still another object of the invention is to provide a machine which includes means to automatically feed cap blanks to the machine and means to automatically remove the finished caps therefrom, the cap blank feeding means including an arrangement to remove from the path of travel of the mandrel or carrier any cap blank which is not properly positioned with respect thereto.

A further object of the invention is to provide an apparatus in which the dies may be readily changed to permit the formation of a number of different types of caps for containers.

In the drawings:

Figure 1 is a side elevation of the machine with parts broken away.

Figure 2 is a plan view of the machine, with parts removed.

Figure 3 is a detail sectional view on the line 3—3 of Figure 2 showing the means for removing the caps from the machine.

Figure 4 is a side elevation of the machine with the upper portion thereof in central longitudinal vertical section on the line 4—4 of Figure 2.

Figure 6 is a detail plan elevation, with portions broken away, and showing one of the cap blank feeding mechanisms.

Figure 7 is a detail transverse sectional view of the cap blank feeding mechanism shown in Figure 6.

Figure 8 is a detail horizontal sectional view of the structure shown in Figure 7.

Figure 9 is a detail transverse vertical sectional view showing one step in the formation of a cap of the lug type.

Figure 10 is a view similar to Figure 9 showing a further step in the formation of a cap of the lug type.

Figure 11 is a detail horizontal sectional view on the line 11—11 of Figure 10.

Figure 12 is a side elevation of the cap formed by the operation illustrated in Figures 9 to 11 inclusive.

Figure 13 is a detail view in horizontal section of a type of stationary die which may be used in the machine.

Figure 14 is a detail front elevation of the die shown in Figure 13.

Figure 15 is a detail transverse vertical sectional view showing a step in the formation of a screw cap.

Figure 16 is a view similar to Figure 15 showing a subsequent step in the formation of a screw cap.

Figure 17 is a view, partly in section, showing the screw cap formed by the method illustrated in Figures 13 to 16 inclusive.

Figure 18 is a detail transverse vertical sectional view showing a means for wiring the preformed cap blank shown in Figures 20 and 21.

Figure 19 is a detail horizontal sectional view showing the wiring die used in Figure 18.

Figure 20 is a plan view of the preformed cap blank operated upon by the method and die used in Figures 18 and 19.

Figure 21 is a vertical sectional view of the cap blank shown in Figure 20.

Figure 22 is a plan view of another type of cap blank.

Figure 23 is a vertical sectional view of the cap blank shown in Figure 22.

Figure 5:
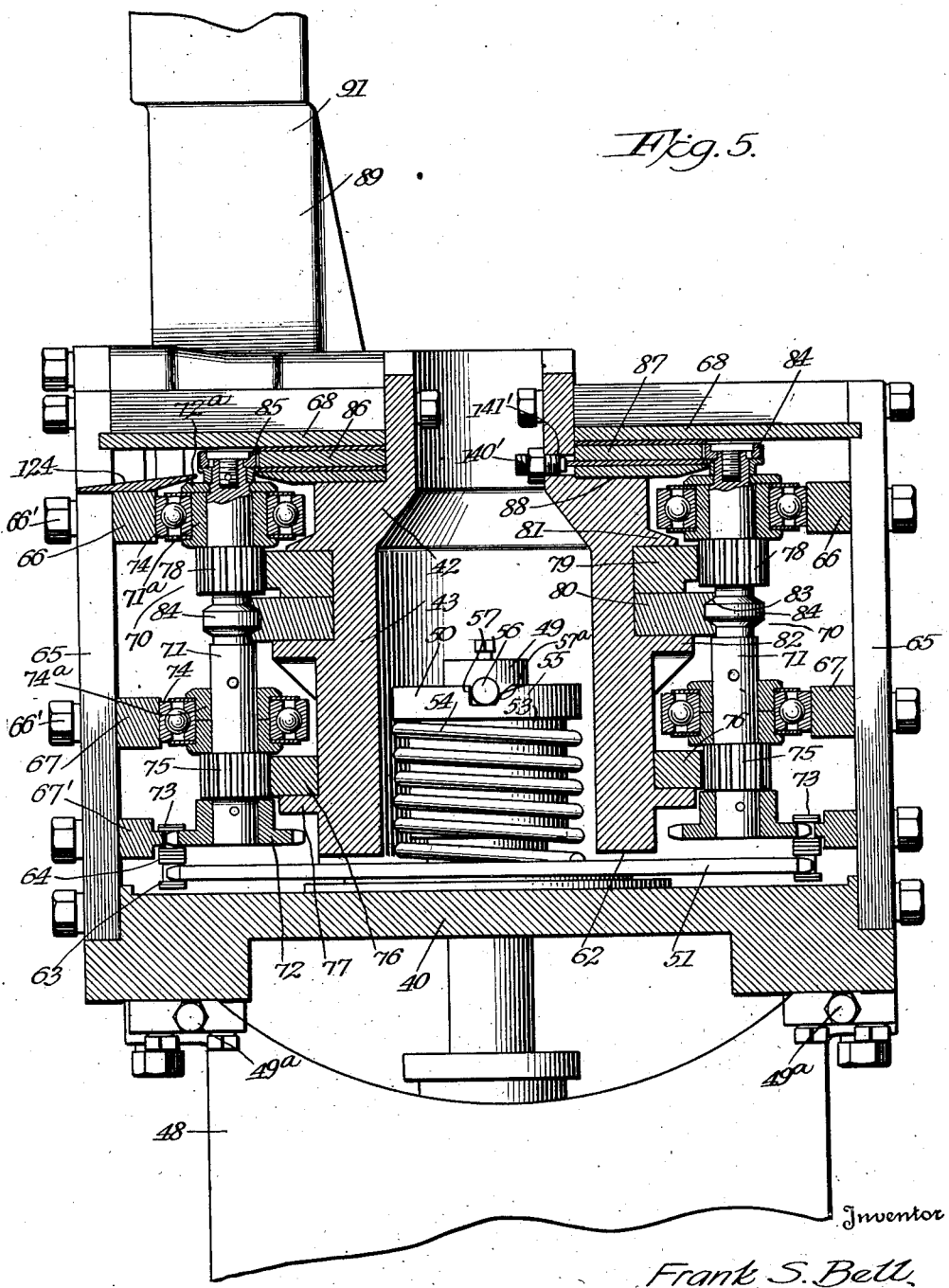
Figure 5 is a transverse vertical sectional view of the machine on a line corresponding to the line 5—5 of Figure 2.

The machine of the present invention comprises a base table 40 supported upon standards 41, and having a central casting or fixed element 42 secured upon its upper surface. As is best shown in Figure 2, the fixed element 42 is preferably hollow and at its lower portion, in horizontal plane, has the form of a flattened ellipse, i. e., an ellipse in which the sides parallel with the major axis are straight. It will be understood that the fixed element 42 may also be regarded as oblong, and, furthermore, may have any other suitable configuration. In the embodiment shown, the straight side walls of the casting 42 are indicated by the numerals 43 and 44, respectively, while the curved end walls are designated by the numerals 45 and 46, respectively.

Figure 4 illustrates an arrangement for holding the central casting or fixed element 42 rigid upon and in proper register with respect to the base table 40. A keyway 40′ extends transversely of the table 40 and a key 42′ projecting downwardly from the side wall 44 of the central casting 42 fits into the keyway. Since the keyway and key extend at right angles to the major axis of the machine, the central casting is thereby properly positioned with respect to this axis.

A driving motor 47 is supported beneath the base table 40, and, through suitable reduction gearing 48, drives a vertical shaft 49, which shaft, as shown in Figure 4, is journalled in the reduction gearing casing. The shaft 49 extends up through an aperture in the base table 40 into the interior of the central casting 42, closely adjacent the end 45 thereof. An automatic release clutch, generally indicated by the numeral 50, is preferably provided upon the shaft 49 and a relatively large sprocket wheel 51 is carried by the shaft. The sprocket wheel 51 is fixed to a flange at the lower end of a sleeve 52 which normally rotates with the shaft 49, the sleeve 52 resting on a collar 53a fixed to shaft 49. A collar 53 is provided about the sleeve 52. The upper end of collar 53 is normally held up past the upper end of the sleeve 52 by a coil spring 54 surrounding the collar, the upper end of the spring bearing against a projecting flange 55 about the upper end of collar 53 while the lower end of the spring bears against the upper surface of the sprocket wheel 51. A pin 56 is fixed to and extends diametrically through the upper end of the shaft 49, the outer ends of the pin being normally seated in notches 57 in the upper end of the collar 53. The sleeve 52 and collar 53 are keyed together by vertical keys 58.

As is best shown in Figure 5, the notches 57 in the upper end of the collar 53 are provided on one side with a straight upstanding wall, while the opposite side wall 57a of the notch is inclined, the upper portion of the wall 57a being less sharply inclined than the lower portion. The ends of the pin 56 which fit into the notches 57 exert driving pressure upon the collar 53 against the lower or driving portion of the inclined walls 57a, the inclination of the lower portion of the wall 57a being sufficiently steep to ordinarily prevent the pin from exerting downward pressure upon the collar 53.

When an overload occurs in the machine, causing the sprocket wheel 51 to move more slowly or to stop altogether, the continued movement of the driving pin 56 will exert pressure against the inclined wall 57a of the notch to depress the collar 53, with the result that the pin will move about upon the upper end of the collar 53. This arrangement to release the driving connection between the shaft 49 and the collar 53 will prevent damage to either the machine parts or the motor and gearing. The provision of the inclined wall 57a upon the notch 57 has a further advantage in that if the notch were provided with two straight and vertical walls, the continued rotation of the shaft 49 and pin 56 upon the collar 53 while the latter is held stationary would permit the pin to drop down into the notch and again have to be released. However, the provision of the inclined wall 57a on the side of the notch toward which the pin 56 is moving will merely permit the pin to ride across the notch without dropping sufficiently far into the notch to touch the more steeply inclined lower portion or driving angle of the notch. When the machine comes to a full stop, and the overload condition is corrected, the pin 56, in its normal rotation, will drop entirely into the notch 57.

A second or driven sprocket wheel 59 of the same diameter as the drive sprocket 51, is rotatably carried upon the lower end of an axle 60 mounted in a boss 61 at the end 46 of the central casting 42. The sprocket wheels 51 and 59 are positioned in horizontal slots or cut-out portions 62 in the ends 45 and 46 of the central casting 42 and the lower run 63 of an endless double sprocket chain 64 encircles the driving sprocket wheel 51 and driven sprocket wheel 59.

In order to permit take-up of wear in the sprocket chain 64, means is provided to permit the casing of the gear reduction device 48, in which the driving shaft 49 is journalled, to be moved along the major axis of the base table 40. The adjusting means comprises a pair of lugs or shoulders 48a, one fixed to each side of the under surface of the base table 40 adjacent the inner side of the casing of the reduction gearing 48. Horizontal set screws 49a extend through the lugs. Stop pins 50a are fixed in the under surface of the base table adjacent the outer side of the gear reduction casing. The bolts 51a which hold the gear reduction casing to the base table extend through slots in the flange 52a at the upper end of the gear reduction casing.

To take up wear in the chain 64, it is only necessary to loosen the bolts 51a and tighten up on the set screws 49a. The pins 50a determine the extreme limit of movement of the gear reduction casing.

Lock nuts may be provided on the set screws 49a and a key and keyway arrangement, not shown, may be provided in the upper surface of the flange 52a and the lower surface of the base table to insure proper directional movement of the gear reduction casing and shaft 49 during the adjustment.

The sprocket 59 is bolted to a flange projecting from a sleeve 251, the sleeve 251 being provided with a journal bushing 252 in order that the sleeve may be freely rotatable upon the axle 60. A collar 253 is fixed to the extreme lower end of the axle to hold the sleeve in proper vertical position thereon. A flange 254 is provided intermediate the length of the axle 60 between the upper end of the sleeve 251 and the lower surface of the boss 61. The upper portion 255 of the axle 60 is eccentric with respect to the lower portion on which the sleeve 251 rotates and fits in an eccentric bore in a bushing 256. The bushing 256 carries a collar 257 at its upper end, and the collar is held to the axle 60 by a pin 258. The collar 257 has circumferentially spaced radial notches on its lower surface to correspond to radial notches spaced about the upper surface of the boss 61. The axle 60 is provided with nuts 259 on its upper end to hold it in adjusted position in the boss 61 and an oil cup may be provided on the upper end of the axle to permit flow of lubricant to the journal 252. One or more radially arranged set screws 260 may be provided in the boss 61, as shown, to hold the bushing 256 against rotation. The extreme lower end of the axle 60 may also be squared as shown at 261 to permit the axle to be engaged by a wrench so that it may be turned for adjustment.

In order to take up slack in the sprocket chain 64, the nuts 259 are loosened and a wrench is applied to the squared portion 261 of the axle 60 to rotate the latter and the collar 257 with respect to the bushing 256 and the upper surface of the boss 61 to the desired degree. The nuts 259 and collar 257 are then removed and the set screws 260 loosened and a spanner wrench applied to notches (not shown) in the upper end of the bushing 256 to rotate the latter in a direction opposite to that in which the axle 60 was rotated and to the same degree that the axle was rotated. The rotation of the axle and the bushing 256 in opposite directions and to the same extent will cause the position of the axle to be varied along the major axis of the machine. The provision of the notches on the upper end of the boss 61 will serve to indicate the degree of rotation of the axle for the subsequent rotation of the bushing.

The adjustment of the axle 60 which can thus be obtained, plus that which can be obtained at the driving shaft 49 in the manner already described, is sufficient to take up enough slack in the chain to take care of one pitch of the chain. Consequently, when the chain stretches one pitch in length, one link can be removed and the shaft 49 and axle 60 moved back to their original positions to accommodate the shortened chain.

A plurality of upstanding posts 65 are spaced about the periphery of the base table 40, the posts being equidistantly spaced from the outer surface of the fixed element or central casting 42. An upper endless rail 66 having its inner surface in the form of a flattened ellipse is fixed upon the inner surfaces of the posts 65 adjacent the upper ends of the posts and a lower endless rail 67 of the same formation is fixed to the posts 65 intermediate the base table 40 and the upper rail 66. The rails 66 and 67 may be formed in sections and held in alignment by means of bolts 66' in the posts 65. The inner edges of hold down plates 68 positioned opposite the side walls 43 and 44 are supported upon the upper and outer surfaces of the side walls 43 and 44 of the central casting 42 in a manner hereinafter described, the outer edges of the plates 68 being fixed to the adjacent posts 65. In order to more securely brace the upper ends of the posts 65, horizontal bracing members 69 extend from the upper ends of the posts 65 and above the hold-down plates to the central casting 42. Similar bracing members are provided between the end walls 45 and 46 and the posts 65 opposite these walls.

About a trackway 70 formed by the rails 66 and 67 and rails, hereinafter described, provided upon the outer periphery of the central casting 42 are positioned circumferentially spaced mandrels or carriers indicated by the numeral 71. The lower end of each of the mandrels 71 has a small sprocket wheel 72 fixed thereto by a taper pin or the like, the sprockets 72 engaging the upper run 73 of the double sprocket chain 64. The mandrels 71 are also provided, as shown in Figures 4 and 5, with upper and lower rollers 74, which rollers are preferably anti-frictionally journalled upon the mandrels 71. Intermediate the sprocket wheel 72 and the lower roller 74 of each of the mandrels 71 there is fixed a pinion 75, which meshes with a rail or rack 76 of endless formation secured upon a shoulder 77 which extends outwardly from the periphery of the central casting 42. Each of the mandrels 71 is also provided with an upper pinion 78 preferably mounted immediately beneath the upper roller 74 and which pinion meshes with an upper rail or rack 79 of endless formation, which, with a rail 80, is fixed between shoulders 81 and 82, provided about the walls of the central casting 42. The rail 80 is of endless formation and is provided with a groove 83 in its outer periphery. A flange 84 upon each of the mandrels 71, which flange is preferably between the upper and lower rollers 74, is adapted to closely fit within the groove 83 of the rail 80. The flange 84 has a diameter equal to the respective pitch diameters of the pinions 75 and 78, providing a perfect rolling action.

The racks 76 and 79 and rail 80 may be formed in sections, the curved end racks preferably being perfect half gears. The sections may be held together by dowels or screws and the racks and rail may be properly aligned by means of the bolts 79' shown in Figure 4. Screws, not shown, threaded in the shoulders 77 and 82 may be provided to lock the racks and rail in position.

By the above arrangement, upon movement of the double sprocket chain 64 by reason of the rotation of the large driving sprocket 51, the mandrels 71 will be moved about in the trackway 70. The engagement of the upper run 73 of the double sprocket chain 64 with the sprocket wheels 72 of the mandrels will cause the mandrels to be moved about the track-way and will also hold them equidistantly spaced apart. The upper and lower gears or pinions 78 and 75 respectively engaging the upper and lower racks 79 and 76 will cause the mandrels to be positively rotated and will hold them in properly aligned vertical position. The racks and pinions are also arranged in such a manner that the movement of the mandrels will be timed, so that, in the repeated movements of the mandrels about the machine, any given tooth of a mandrel pinion will repeatedly mesh with the same gear rack teeth. The anti-frictionally mounted rollers 74 engaging the upper and lower rails 66 and 67 will permit the mandrels to rotate without friction and will also prevent the mandrels from having an outward movement with respect to the central casting 42. The grooved flanges 84 of the mandrels in engagement with the inner grooved rail 80 will prevent the mandrels from moving inwardly with respect to the central casting and will also prevent the mandrels from having any vertical movement. A rail 67', beneath the lower rail 67 and opposite the side walls 43 and 44 of the central casting 42, holds the chain 64 in position against the sprockets 72 so that they will mesh and to prevent the chain from sagging out from the teeth.

As shown in Figure 5, the inner race of the anti-friction bearings of the upper roller 74 is carried on a sleeve 71a which rests upon the upper end of the upper pinion 78. The sleeve 71a has a shoulder at its lower end upon which the raceway rests. A collar 72a rests upon a shoulder about the mandrel and projects past the sleeve, as shown, to hold the raceway in position thereon. The sleeve 71a and collar 72a are held in position by the die head structure generally indicated by the numeral 85 which is carried at the upper end of each of the mandrels and is hereinafter described in detail. The inner race-way of each of the antifriction bearings of the lower roller 74 is held between two flanged sleeves 74a formed of vertically split sections held together and down upon the pinion 75 by a pin extending through the mandrel.

As is best shown in Figures 1, 5, 9 and 10, the greatest external diameter of each of the die heads 85 is smaller than the smallest internal diameter of the finished cap to be formed on the die-head and the diameter of the heads is the same as the pitch diameter of the pinions 75 and 78.

Fixed dies generally indicated by the numerals 86 and 87, respectively, are secured upon the shoulders 88 projecting from the upper portion of the outer surfaces of the respective side walls 43 and 44 of the fixed element 42 by vertical bolts, as is best shown in Figures 2 and 5. The inner ends of the hold-down plates 68 are held upon the dies 86 and 87.

Cap blanks are positioned upon the die heads 85 of the mandrel 71 by cap blank feeding mechanisms generally indicated by the numerals 89 and 90, respectively, one of these mechanisms being provided adjacent the approach end of each of the fixed die members 86 and 87.

The cap blank feeding mechanism 89 and 90 are both of exactly similar construction but face in opposite directions as shown in Figure 1, so that cap blanks may be moved therefrom by the mandrels in their approach toward the respective fixed dies. The cap blank feeding mechanisms may include upstanding chutes 91 extending upwardly from the chambers 92 which chambers are positioned above the trackways 70, and in the path of movement of the die heads 85. The chambers 92 are supported at their inner edges upon the shoulder 88 and at their outer edges upon the adjacent post 65. The chutes 91 are of U-shaped formation in cross-section, as shown in Figure 6, the outer ends of the flanges thus provided having plates 95 and 96 extending inwardly therefrom as shown in that figure to form a passageway for cap blanks. The inner and adjacent ends of the plates 95 and 96 are spaced apart so that the cap blanks within the chute will be visible to the operator.

It will be understood that the chutes 91 may be arranged in any desired manner and, if necessary, may extend directly from the press by which the cap blanks are formed.

The passageway provided for cap blanks in the chutes 91 is aligned with a cap blank passageway 97 which extends through the chamber 92 at a downward inclination, as shown in Figures 1 and 6. On the inner side wall of the passageway 97, at the extreme lower end thereof, a shoulder 98 is provided for a purpose hereinafter set forth.

The cap blanks may be presented in the chute 91 in any suitable manner and will, by gravity, move down into the passageway 97 through the chamber 92.

As is best shown in Figures 6 and 7, means is provided in an opening 92' in the outer side wall of the chamber 92 to control the feeding of the cap blanks to the die heads 85 of the mandrels 71. The upper surface of the upper rail 66 is cut away at 100 beneath the chamber 92 and a trip lever 101 pivoted on a shouldered stud 102 on the upper surface of the cut-out portion has its inner surface 103 normally projecting past the inner side of the rail 66 into the trackway 70 beneath the plates 95 and 96 of the passageway 97 as best shown in Figures 7 and 8. Trip lever 101 includes a projection 104 on its outer side intermediate its ends and is provided with an aperture 105 into which projects an eccentric 106 including a pin 107 which is fitted in a vertical bore in the rail 66. The pin 107 may be manually rotated to vary the position of the eccentric 106 to adjust the range of horizontal movement of the trip lever 101 with respect to the rail 66 and, in turn, the movement of the holding levers hereinafter described. A downwardly projecting pin 108 carried at the free end of a lever 109 pivoted upon a shouldered stud 110 carried by the chamber 92 bears against the surface 104 of trip lever 101 in the cut-out portion 100 of the rail 66. Lever 109 also has fixed thereto an upstanding stud 111 having the outer end of a coil spring 112 secured to its upper end. The coil spring 112 extends across the upper surface of the chamber 92 and its inner end is attached to a pin 113 at the inner edge of the chamber. Lever 109 is provided intermediate its length with a slot 114 (Figure 7) into which extends a downwardly projecting pin 115 having a shoulder 115a, the portion of the pin above the shoulder being rotatable in a bore in the lever 116. Lever 116 is pivoted upon a shouldered stud 117 fixed on the underside of the upper wall of the opening 92' of chamber 92.

A link 119 having one end pivotally connected to the pin 115 extending through the outer end of the rear holding lever 116 has its opposite end pivotally connected to a pin 120 provided intermediate the length of an outer holding lever 121, the outer end of which is pivoted on a pin 122 projecting downwardly from the upper wall of the opening 92'. As shown in Figure 6, levers 116 and 121 are in the same plane, the link 119 being beneath them.

The position of the elements described above is normally as shown in Figure 6. In this position, the forward holding lever 121 is projected into the passageway 97 and holds the lowermost cap blank in the position indicated at A by engaging the vertical wall of the cap blank. The rear holding lever 116 is held out of the passageway 97. It will be noted that in this position, the wall of the blank will engage the shoulder 98, preventing the flange of the blank from being pressed against the inner side wall of the passage 97 and thereby bent.

The operation of the cap blank feeding mechanism is as follows:

With the machine in operation and the mandrels 71 moving about in the trackway 70, when a mandrel moves beneath one of the feeding mechanism chambers 92, the upper and outer periphery of the upper roller 74 of the mandrel will contact with the inner surface 103 of the trip lever 101. At the same moment, the die head 85 of the mandrel will move into the interior of the lowermost cap blank indicated at position A, the cap blank being downwardly inclined by reason of the inclination of the passageway 97. The outward movement of the trip lever 101 caused by the contact therewith of the roller 74 will swing the trip lever 101 upon its pivot 102 against the action of the spring 112. The movement of trip lever 101 will force the lever 109 outwardly away from passageway 97 through pressure exerted against pin 111 fastened to lever 109 and since the latter lever is connected to rear holding lever 116 by pin 115 and to outer holding lever 121 by means of pin 115 and link 119, these two last mentioned levers will change their position, outer holding lever 121 being moved out of engagement with the cap blank shown in position A while rear holding lever 116 will move out into the passageway 97 and into engagement with the cap blank shown at position B. The cap blank previously at position A will be carried off the lower ends of the plates 95 and 96 by the mandrel 71 and along the trackway 70. As soon as the upper roller 74 of the mandrel moves out of engagement with the inner surface 103 of the trip lever 101, the trip lever 101, lever 109, rear holding lever 116, and outer holding lever 121 will again be moved to the position shown in Figure 6 by the action of the spring 112. Retraction of rear holding lever 116 from the passageway 97 will permit the cap blank which it has been holding at position B to move downwardly in the passageway 97 and into contact with the outer holding lever 121. The cap blanks behind and above this cap blank in the chute will move downwardly by gravity against the lowermost cap blank. In order to insure rapid downward movement of the cap blanks in the chute 91, a nozzle 91' may be provided beneath the lower end of the chute to direct a blast of compressed air against the blanks.

It sometimes occurs that the die heads 85 of the mandrels do not engage the lowermost cap blank as the cap blanks are released from the outer holding lever 121 in the manner described in the preceding paragraph. In order to prevent cap blanks which have been removed from the passageway 97 but which are not positioned upon the die heads from dropping down into the machine, a wire 123 (Figs. 2 and 6) is provided on the inner side of the trackway 70 beneath the cap blank feeding mechanisms 89 and 90 and a metal plate 124 having an extended portion or strip 125 is provided on the outer side of the trackway 70. The wire 123 and the strip 125 are sufficiently close together that the edges of the cap blanks will straddle the same after they have been removed from the passageway 97. By this arrangement, if a cap blank is removed from the position indicated at A in Figure 6, but does not drop upon the die-head 85 which released it, the blank will straddle the wire 123 and strip 125 and will be pushed along trackway 70 by the next succeeding die-head. The plate 124 is downwardly inclined, as shown in Figure 5, with the result that when the cap blank reaches this point, it will slide down the plate 124 and out of the machine.

It will be understood that the fixed dies indicated by the numerals 86 and 87 and the die heads 85 of the mandrels may be of any configuration necessary to form cap blanks of various shapes into caps of any desired form. However, the forms of die heads and stationary dies hereinafter referred to are preferred types of these elements which can be used with the present apparatus for forming caps of various types.

The fixed dies 86 and 87, respectively secured upon the walls 43 and 44 of the fixed element 42, as illustrated in Figures 2 and 5, and the fixed dies and moving die-heads illustrated in Figures 9 to 11, inclusive, are particularly intended for forming caps of the "lug" type. Fixed die 86 is shown in Figure 2 as comprising three (3) die elements, disposed side by side along the side wall 43 of the central casting 42. The left-hand die element 131 of this figure is a knurling and first wiring die. The second die element 132 is a knurling and second wiring die while the right-hand die element 133 of Figure 2 is the lug forming die and also finishes the wiring and knurling. It will be understood that the fixed dies 87 on the side wall 44 of the fixed casting of the machine comprising die elements similar to those just described but the die elements 131', 132' and 133' on the side wall 44 are arranged in order from right to left with respect to Figure 2 or in reverse direction to those on the side wall 43 so that the first wiring die 131' on side wall 44 will be adjacent the cap blank feeding mechanism 90 on that side of the machine. The structure of the die elements on side wall 44 will, therefore, be apparent from the following description of the die elements on side wall 43.

Figure 9 illustrates the preferred detail construction of the second wiring and knurling die element 132 and Figure 10 illustrates the detailed construction of the "lug" forming die element 133, both these views being in vertical section. The second wiring die element 132 comprises a lower die member 134 which rests directly upon the shoulder 88 of the fixed element or central casting 42. A finishing wiring groove 135 is provided in the outer edge 136 of the die member 134. A knurling die member 137 rests upon the die plate 134, its outer edge being corrugated or toothed so that it will knurl the die blank in a manner hereinafter described. A plate or shim 138 bears upon the die member 137 and spaces the latter plate from the hold-down plate 68. If desired, the plate 138 and member 137 may be made integral.

The first wiring and knurling die element 131 is exactly similar to the second wiring and knurling die element shown in Figure 9 and just described, with the exception that the left-hand end of its knurling die member has a lead-in portion in which the knurling teeth have gradually increasing depth. Also, the wiring groove of the first die element 131 corresponding to wiring groove 135 of the element 132 is deeper than the latter wiring groove; in other words, the first wiring die element 131 is a preliminary wiring die while the second wiring die element 132 gives the wiring of the cap blank its final form. In front elevation, die elements 131 and 132 are similar to the two wiring and knurling dies 181 and 182 shown in Figure 14.

The lug forming die element 133 shown in cross-section in Figure 10, includes a lower member 139, which rests directly on the shoulder 88 of casting 42. Two lug forming tools or blades 140 and 141 are secured in grooves in the plate 139 and are properly spaced apart along the plate to form diametrically opposite lugs in the finished cap as hereinafter described. The lug forming blades are held in proper outer position by threaded studs 140' (Figure 5) adjustable in threaded bores 141' in the upper portion of the fixed element 42, the inner ends of the studs bearing against the rear edges of the blades 140 and 141. A knurling die member 142 similar to knurling die member 137 is secured above the lug forming tools or blades 140 and 141, as shown, and a plate 143 spaces the knurling die member 142 from the hold-down plates 68 and also varies the offset above the knurling on the cap blank. The position of the plate 143, like that of all of the parts of the die elements, may be adjusted as desired to vary the configuration of the caps to be formed on the machine. The wiring grooves 135 of the die elements 131 and 132 are, of course, horizontally aligned with each other and with the lug forming blades 140 and 141. The knurling members 137 and 142 are also in horizontal alignment and a wiring groove similar to the wiring groove 135 of die element 132 extends across the plate 139 of the lug-forming die 133 to prevent the wiring on the cap blank 85 from being distorted during the lug forming operation.

It is desirable to have the knurling member of the first die element 131 very slightly more distant from the center line of the mandrels, the knurling member 137 of the second die element slightly less distant and the knurling member 142 of the lug-forming die element 133 even less distant, but by a very slight degree. This arrangement causes the depth of the knurling of the cap blank to be gradually increased. The teeth at the extreme right hand end of the knurling member of lug-forming die element 133 are tapered off to form a lead-out portion.

The moving die head 85 carried at the upper end of each of the mandrels 71 is also illustrated in detail in Figures 9 and 10 and in Figure 11. Referring to Figures 9 and 10, it will be noted that the die head 85 comprises an upper or knurling die member 145 of cylindrical form and a lower die 146 of similar form, but provided with a flange 146' which is adapted to be opposite the lower portion of the cap blank. Both the members 145 and 146 are keyed at 147 to the reduced upper end 148 of the mandrel 71 and are held on the upper end of the mandrel by means of a machine screw 149 threaded into the upper end of the mandrel. A locking taper pin 150 is passed through a clearance hole in the lower die 146 to lock the machine screw 149 to the mandrel head 148. The die head 85 is of less diameter than the interior of the cap blank C, as has been previously stated.

In the operation of forming the cap blank C (Figures 9, 10 and 11) into a finished cap C' (Figure 12), the cap blank C is moved against and along the first wiring and knurling die 131 and due to the rotation of the mandrel 71, the cap blank C will be rolled along the fixed die. Corrugations or teeth 145' about the periphery of the upper or knurling member 145 of the die head 85 will interengage with the corrugations or teeth on the outer surface of the knurling plate of the fixed die 131 to knurl the cylindrical side walls of the cap blank C at 155. The deep wiring groove in the lower die plate of the fixed die 131 will turn the flange or skirt of the die blank C upwardly to the form shown at 156 in Figure 9, the flange of the cap blank being held against outward movement with respect to the groove by the flange 146' on member 146. As the cap blank is moved past the second fixed die element 132, the corrugations on the knurling element 145 of die head 85, with the knurling which has now been formed on the cap blank C, will interengage with the corrugations on the outer surface of the corrugated die member 137 of the fixed element, causing the cap blank C to be rotated with respect to the fixed die element 132. The wiring groove 135 of the fixed element will complete the preliminary wiring formed by the first die element giving the wiring the shape shown at 157 in Figure 9. When the mandrel 71 moves opposite the third die element 133, the moving die head 85 will cooperate with the corrugated die member 142 to continue the timed rotation of the cap blank C and when the cap blank C comes opposite the first lug-forming blade 140, a section of the wired portion of the cap blank will be pressed inwardly by that blade as indicated in Figures 10 and 11, the timing of the elements being so arranged that the blade 140 will interengage with a depression 158 on the periphery of the flange 146' of the lower member 146 of the moving die head 85. Continued rotation of the cap blank C will cause the second lug forming blade 141 to be aligned with a depression 160 in the lower member 146 of the die head 85 to form a second lug in the wired portion of the cap blank, which lug will be diametrically opposite the first lug 159. Since the cap blank C is oversized with respect to the die head 85, it will be noted that the depressions 158 and 160 in the moving member 146 are not in diametrically opposite positions, these depressions being so spaced about the member 146 that the oversized cap blank will have the lugs properly positioned thereon. It will be understood that more than two lugs may be formed in the cap C merely by providing more depressions in the flange 146' and using a corresponding number of lug forming tools or blades.

An important purpose of the knurling arrangement described is to cause the cap blank to be properly rotated with respect to the dies during the entire die forming operation. Unless this means is provided, the cap blanks, being oversized with respect to the die head 85 of the mandrel, might slip in a turning direction with respect to the mandrel, which would result in improperly formed caps.

It will be noted that the hold-down plate 68 prevents vertical movement of the cap blank with respect to the die members throughout the die forming operations, and in the formation of the cap, the material is folded upwardly from its lower portion throughout all of the steps of the die forming operation. This prevents any stretching of the material of the cap blank which might strain or weaken the same.

The completed cap of the above operation is shown at C' in Figure 12.

When the mandrels have moved past the final die element 133, they next pass into the cap removing mechanism generally indicated by the numeral 165, one of these mechanisms being positioned at the exit end of the stationary dies 86 and 87 on the respective sides of the machine. Each of the cap removing mechanisms includes a chamber 166 positioned above the trackway 70, but in the path of the die heads 85, the chamber being supported upon the shoulder 88 of the central casting 42 and upon the opposite post 65 as best shown in Figure 2. The chamber 166 is provided with converging lead-in walls 166a and an upwardly inclined passageway 167 (Figure 3) which, as shown in Figure 2, is aligned with the path of movement of the die heads 85. The converging lead-in walls 166a guide the cap blank into the passageway 167, which passageway includes spaced projecting shelves 168, the outer ends of which will be beneath the lower edges of the caps C' when the die heads 85 move between the shelves. As the die head moves between the shelves the cap thereon will be readily lifted upwardly from the die head by the shelves since the caps are oversized with respect to the die heads. At the same time, the caps will be given a movement along the shelves by the moving die head. The rapid movement of the die heads will, in fact, throw the caps C' along the shelves and into the passageway 167 from which passageway the caps will pass into a chute 169 and leave the machine.

Spring pressed blocks or ratchets 170 may be provided in depressions 171 in the side walls of the passage 167 to prevent any possible return of the caps towards the trackway 70.

Figures 13 to 16, inclusive, illustrate the dies used with my machine for the purpose of forming threaded cap blanks. Referring particularly to Figures 13 and 14, the fixed die generally indicated by the numeral 180 is preferably formed of three (3) die elements, a first wiring and knurling die element 181, a second wiring and knurling die element 182, and a threading and knurling die element 183. These die elements are shown assembled in Figures 13 and 14, Figure 13 also illustrating the passage of the mandrels 71, including die-heads 85 carrying cap blanks 187 past the fixed die elements.

Figure 15 shows the second wiring and knurling die element 182 in vertical section and, as indicated in this figure, this die element comprises a lower die member 184 which would rest directly upon the shoulder 88 of the central casting 42 of the machine. The die member 184 includes a finishing wiring groove 185. A knurling die member 186 is supported above the wiring die member 184 and the hold-down plate 68 rests upon the latter. The first wiring and knurling die element 181 is exactly similar to the second wiring and knurling die element 182 illustrated in Figure 15, but has its knurling teeth slightly more distant from the center-line of the mandrel. Die element 181 also has a deeper wiring groove so that it will form the flange of the cap blank indicated at 187 to the shape shown at 188 in Figure 15. The groove 185 of the second wiring and knurling die 182 will form the cap blank to the finished shape indicated at 189. The cap blanks used with the die illustrated in the Figures 13 to 16, inclusive, are preferably preformed, in that the upper surface of the cap blank is indented as shown at 190 as indicated in Figures 15, 16 and 17.

The operation of the first and second wiring and knurling die elements 181 and 182 will be obvious from the description of the similar die elements which has been previously set forth in connection with Figures 9 and 10.

After moving past the die elements 181 and 182, the cap blank 187 will be rotated in contact with the threading die element 183. This die element comprises a lower member 191 which rests directly upon the shoulder 88 of the central casting and which includes a thread forming projection 192 which, as indicated in Figure 14, is downwardly inclined from the approach end of the die element 183 (the left-hand end as viewed in Figure 14). The die member 191 also includes a lower cutout portion 193 to accommodate the passage of the wired edge 189 of the blank.

The die head 195 used on each of the mandrels 71 for the formation of the threaded cap blanks is secured to the mandrel in the same manner as the moving die heads 85 described in connection with Figures 9 and 10, and includes an upper or knurling flange 196 and a lower threading portion 197, the threading portion being spirally ribbed as shown in Figures 15 and 16. A lower flange 198 is provided beneath the threading portion 197 and in alignment with the lower wired edge which is to be formed upon the cap blank, this flange cooperating with the wiring groove of the fixed die to form the wired edge on the cap.

In the movement of the cap blank 187 past the threading die 183, the rib 192 on the stationary member 191 will inter-engage with the spiral rib 197 on the moving die head 195 to form a thread upon the cap blank as illustrated in Figure 16. Figure 16 also illustrates how the material in the cap blank is folded upwardly during this operation to form a hook-shaped thread of the type disclosed in the application of Eric B. Kramer, Serial No. 552,494, filed July 22, 1931. The complete cap formed by these die elements is illustrated in Figure 17 but it will be understood that caps having threads of various cross-sections may be formed by changing the dies.

Figure 27:
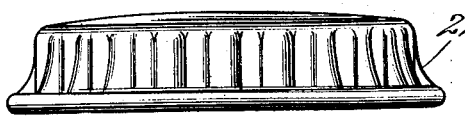
Figure 27 is a side elevation of the cap formed by the dies of Figures 24 to 26.

Figures 18 and 19 show the moving die head and stationary die used to form a finished crown cap of the type shown at 225 in Figure 27 from a preformed cap blank 200 of the type illustrated in Figures 20 and 21.

The moving die head 201 used on each of the mandrels 71 for this operation comprises a die ring 202 which rests upon a sleeve 203 having a wire supporting flange 204, as shown. The ring 202 and sleeve 203 are held upon the mandrel by a chuck screw 205 having its upper surface rounded, as shown, the chuck screw head being of the same diameter as the upper portion of the die ring 202. It will be noted that the die ring 202 is provided with serrations 206 of suitable form but which preferably slope outwardly from top to bottom as shown. A key 207 locks the ring 202 and sleeve 203 together and holds them against rotation with respect to the mandrel 71. The chuck screw 205 is held in locked position by a taper pin 208 inserted in the manner described in connection with the die head of Figures 9 and 10.

The curvature of the upper surface of the chuck screw 205 corresponds to the curvature of the inner surface of the crown cap to be formed and finished thereon to the shape shown in Figure 27, and the configuration of the entire die head 201 is such that it exactly corresponds to the interior of the finished cap of Figure 27.

A hold-down plate 209 is provided with a groove 210 on its lower surface which exactly corresponds in cross section to the curvature of the finished crown cap of Figure 27. The provision of the groove 210 in the hold-down plate prevents the rounded top cap blank from rocking or having any movement with respect to the die head and the stationary die. The shoulder formed by the flange 204 on sleeve 203 prevents the lower edge of the cap from being pressed inwardly.

The stationary die 211 comprises a wiring die 212 having a retainer strip 213 positioned above the same and beneath the hold-down plate 209, a spacer plate 215 being provided between wiring die 212 and hold-down plate 209. Springs 214 are provided between the rear or inner surface of the retainer strip 213 and the front face of the spacer plate 215, these springs tending to hold the retainer strip 213 outwardly as shown in Figure 18. Upwardly projecting pins 216 spaced along the wiring die 212 extend into slots 216a provided in the retainer strip 213 and limit the movement of the strip. The slots 216a permit the strip to have a predetermined horizontal movement with respect to the center line of the mandrel 71.

The surface 217 of the retainer strip 213 may be of any suitable shape which will engage the upper periphery of the cap without marring its surface. The right-hand end of the strip 213 has a lead-off as shown at 213a.

The stationary wiring die 212 is provided with a wiring groove 212a which may have either a long lead-in 212b as shown in Figure 19, or a relatively short lead-in. If desired, the wiring operation may be performed in two steps as described in connection with the structure of Figures 9 and 10, in which case a relatively short lead-in would be provided on the first wiring die and a second lead-in provided on the infeed end of the second wiring die, both of these lead-ins being of substantially the same length and having substantially the same angle. A lead-out may be provided on the extreme right-hand end of each of the three types of wiring dies described.

In the operation of the apparatus of Figures 18 and 19, a cap blank 200 of the type shown in Figures 20 and 21 would be positioned on the moving die head 201 by a cap blank feeding mechanism such as those shown in Figure 6. In the event that the serrated walled cap blanks should not be deposited on the moving die head in such a manner that the serrations in the cap blank would correspond to the serrations 206 of the die head, contact of the cap blank with the hold-down plate and stationary die would move the cap blank into proper alignment with the serrations on the moving die head. The skirt of the cap shown at the left-hand portion of the cap blank in Figure 18 would be formed into a wired edge as shown at the right-hand portion of the cap blank of Figure 18 by rotation of the moving die head with respect to the stationary die 211.

With the structure described above, the cap blank cannot rock or have any movement with respect to the die head and a properly wired edge will be formed about the blank. The completed cap may be readily removed from the die head by a cap removing mechanism similar to that shown at 165 in Figures 2 and 3.

Figure 24:
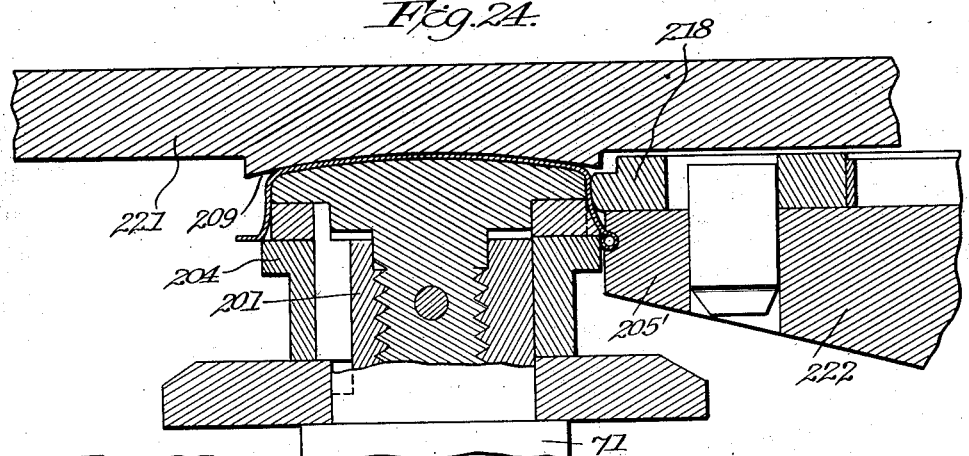
Figure 24 is a detail transverse vertical sectional view showing one step in the formation of the completed cap shown in Figure 27 from the cap blank of Figures 22 and 23.
Figure 25:
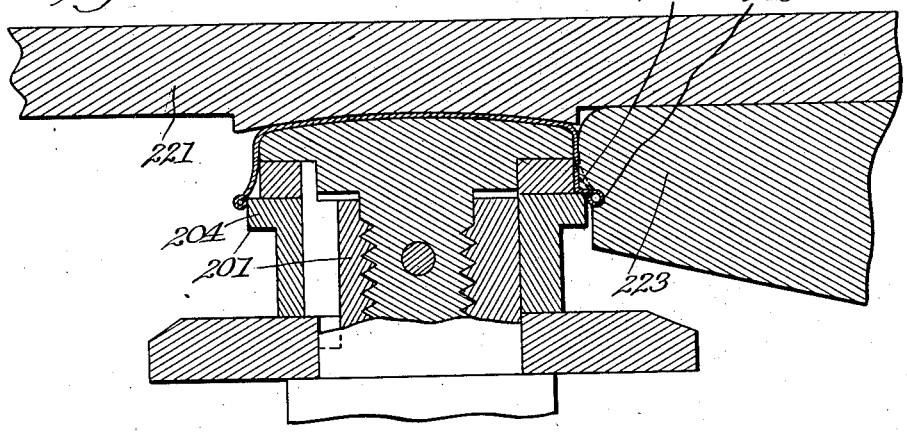
Figure 25 is a detail vertical sectional view showing a subsequent step in the formation of the cap shown in Figure 27.
Figure 26:
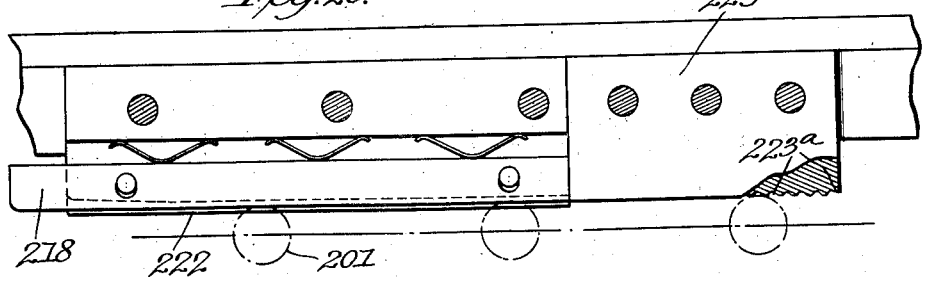
Figure 26 is a detail horizontal sectional view showing the dies used in Figures 24 and 25 in the formation of the cap blank of Figure 27.

Figures 24, 25 and 26 show the stationary die and moving die head used to form a finished crown cap of the type shown at 225 in Figure 27 from a cap blank of the type illustrated in Figures 22 and 23. The moving die head 201 used on each of the mandrels 71 for this operation is identical in construction with the die head 201 of Figure 18 and the hold-down plate 221 is likewise identical with the hold-down plate 209 of Figure 18. The retainer strip 218 is also similar to the retainer strip 213 of Figure 18, but, as shown in Figure 26, has no lead-off angle at its extreme right-hand end. The wiring die 222 of Figure 24 may have any one of the three forms discussed in connection with Figures 18 and 19.

Figures 25 and 26 show a die 223 provided with a serrated die face portion 224, which die is positioned at the outfeed end of the wiring die 222 and in horizontal alignment with the latter die. The serrated portion 224 on the face of die 223 is adapted to cooperate with the serrations 206 on the moving die head to give the cap blank the form shown in Figure 27. A groove 219 is provided in the die member 223 in alignment with the wiring groove of wiring die 222. The extreme right-hand end is preferably tapered to form a lead-out portion 223a.

A cap blank of the type shown in Figures 22 and 23 positioned on the moving die head 201 of Figures 24 to 26, inclusive, will first have its edge wired by movement past the stationary die 222 as described in connection with Figures 18 and 19 and its wall will then be serrated by movement past the die 223. The cap blank will be held against movement with respect to the dies by the groove 209 of the hold-down plate and its fit upon the die-head, just as in Figures 18 and 19.

It will be understood that the invention is not limited to the details of construction shown in the drawings and that the examples of the use of the apparatus and method which have been given do not include all of the uses of which the apparatus is capable or by which the method may be followed; also, that the phraseology employed in the specification is for the purpose of description and not of limitation.

I claim:—

1. An apparatus of the class described comprising an element, opposed rail members carried by said element and forming a trackway, a second element positioned in the trackway, a forming die carried by one of the elements, the other element being adapted to support a blank, and means to move one of the elements with respect to the other to cause the blank to be presented to the die.

2. An apparatus of the class described comprising an element, opposed rail members carried by said element and forming a trackway, a forming die carried by the element, a blank carrier positioned for movement in the trackway, and means to move the carrier in the trackway to present the blank carried thereby to the die.

3. An apparatus of the class described comprising an element, opposed rail members carried by said element and forming a trackway, a forming die carried by the element, a blank carrier positioned for movement in the trackway, and means to move the carrier in the trackway to present the blank carried thereby to the die and to cause the carrier to be rotated with respect to the die during such movement.

4. An apparatus of the class described comprising an element, opposed rail members carried by said element and forming a trackway, a forming die carried by the element, a blank carrier positioned for movement in the trackway, means to move the carrier to present the blank carried thereby to the die, and means fixed to the element to cause the carrier to be rotated during its movement.

5. An apparatus of the class described comprising an element, opposed rail members carried by said element and forming a trackway, a forming die carried by the element, a blank carrier positioned in the trackway, means to move the carrier in the trackway in one plane to present the blank to the die and to cause the carrier to be rotated with respect to the die during such movement, and means to hold the carrier and blank carried thereby against movement out of the plane in which they are moved by the last named means.

6. An apparatus of the class described comprising a stationary element, opposed rail members carried by said element and forming an endless trackway, a forming die carried by the stationary element, blank carriers spaced about the trackway, and a driving element engaging the carriers to cause them to be moved in the trackway to present the blanks carried thereby to the die and to be rotated with respect to the die during such movement.

7. An apparatus of the class described comprising a stationary element, opposed rail members carried by said element and forming a trackway, a blank carrier positioned for movement in the trackway, a forming die carried by the stationary element on one side of the trackway, and means on the other side of the trackway to move the carrier to present the blank carried thereby to the die and to cause it to rotate with respect to the die.

8. An apparatus of the class described, comprising a stationary element, a cap forming die carried by the stationary element, carriers for supporting cap blanks, said carriers being spaced about the stationary element, means to feed cap blanks to the carriers, an endless driven element engaging the carriers to move them to present the caps carried thereby to the die and to rotate the carriers with respect to the die during their movement, and means for removing the caps from the carriers.

9. An apparatus of the class described comprising a stationary element, a cap forming die carried by the stationary element, a trackway included in and extending about the stationary element, cap blank carriers spaced about the stationary element in the trackway, means to feed cap blanks to the carriers, an endless driving element encircling the stationary element and engaging the carriers to move them about the stationary element to present the cap blanks carried thereby to the die and rotate them with respect to the die during such movement, and means to remove the caps from the carriers.

10. An apparatus of the class described comprising a base, a stationary element carried by the base, a guide rail encircling the stationary element and spaced therefrom, a cap forming die carried by the stationary element, cap blank carriers positioned between the stationary element and the guide rail, means to feed cap blanks to the carriers, driving means engaging the carriers to move them about the stationary element to present the blanks carried thereby to the die and to cause them to rotate with respect to the die during such movement, and means to remove the caps from the carriers.

11. An apparatus of the class described comprising a base, a stationary element carried by the base, a guide rail carried by the stationary element, a guide rail encircling the stationary element and spaced therefrom, a cap forming die carried by the stationary element, cap blank carriers positioned between the stationary element and the last named guide rail and including means to engage both of the guide rails, a gear on each of the carriers, an endless flexible driving element encircling the stationary element and spaced therefrom to engage the gears on the carriers to move the carriers about the stationary element to present the cap blanks carried thereby to the die and to rotate them with respect to the die during such movement, and means secured to the base to bear upon the endless driving element to further hold the carriers in proper alignment during their movement past the die.

12. An apparatus of the class described, comprising a substantially oblong stationary element, forming dies fixed on opposite sides of the stationary element, carriers spaced about the periphery of the element, means to feed blanks to the carriers, means to move the carriers about the stationary element to present the blanks to the dies and to rotate the carriers with respect to the dies during their movement, and means for removing the formed blanks from the carriers.

13. An apparatus of the class described comprising a substantially oblong stationary element, a feed mechanism for cap blanks at one end of each of opposite sides of the stationary element, the respective oppositely disposed feeding mechanisms being positioned at opposite ends of the stationary element, cap forming dies carried on opposite sides of the stationary element, carriers for receiving and supporting cap blanks spaced about the periphery of the stationary element, means to move the carriers about the stationary element and to rotate them with respect to the dies during their movement to present the cap blanks carried thereby to the dies, and means to remove the caps from the carriers after movement past the respective dies.

14. An apparatus of the class described comprising a substantially oblong stationary element, cap blank carriers spaced about the periphery of the stationary element, a feeding mechanism for cap blanks at one end of each of the opposite sides of the stationary element, the respective feeding mechanisms being positioned at opposite ends of the stationary element, cap forming dies carried on opposite sides of the stationary element, an endless member engaging the carriers to move them about the stationary element, a gear element fixed to the stationary element, a gear carried by each of the carriers in engagement with the gear element, and means to remove the caps from the carriers after movement of the carriers past the respective dies.

15. An apparatus of the class described comprising a stationary element, a gear element fixed to the stationary element, a cap forming die fixed to the stationary element, a cap blank carrier, means to feed cap blanks to the carrier, an endless gear element surrounding the stationary element, means to move the last named gear element, said carrier including gears engaging both of the gear elements to cause the carrier to be moved about the stationary element and simultaneously rotated to present the blanks carried thereby to the die, and means to remove caps from the carriers.

16. An apparatus of the class described comprising a stationary element, a gear element fixed to the stationary element, a cap forming die fixed to the stationary element, a cap blank carrier, means to feed cap blanks to the carrier, an endless gear element surrounding the stationary element, means to move the last named gear element, said carrier including gears engaging both of the gear elements to cause the carrier to be moved about the stationary element and simultaneously rotated to present the blanks carried thereby to the die, means to prevent vertical movement of the carrier and cap blank and means to remove caps from the carrier.

17. An apparatus of the class described comprising a stationary element, a plurality of cap forming dies spaced about the stationary element, cap blank carriers positioned about the stationary element, means to feed cap blanks to the carriers positioned adjacent the approach end of each of the dies, means for removing caps from the carriers positioned adjacent the out-feed end of each of the dies, and means to move the carriers to present the cap blanks carried thereby to the dies and to cause them to rotate during such movement.

18. An apparatus of the class described comprising a fixed element including a cap forming die having a rectilinear surface, cap blank carriers spaced along the fixed element, means to feed cap blanks to the carriers, endless means engaging the carriers to move the same to present the blanks to the die, means fixed to the die to cause the carriers to be rotated during their movement and means for removing caps from the carriers.

19. An apparatus of the class described comprising a stationary element, a fixed die of straight-line formation carried by the stationary element, cap blank carriers, means to feed cap blanks to the carriers, means engaging the carriers to move the latter about the stationary element to present the cap blanks to the dies during a portion of their movement and to rotate the carriers during such movement and means for removing caps from the carriers.

20. An apparatus of the class described comprising a stationary element, opposed rail members carried by said element and forming a trackway, a cap forming die carried by the stationary element, a cap blank carrier in the trackway, means to feed cap blanks to the carrier, endless driving means engaging the blank carrier to move the same to present the blank to the die, means carried by the stationary element to cause the carrier to rotate in timed relation to the die, and means to remove the cap from the carrier.

21. An apparatus of the class described comprising a stationary element, opposed rail members carried by said element and forming a trackway, a cap forming die carried by the stationary element, a cap blank carrier positioned in the trackway, said carrier being provided with a cap blank supporting portion of less diameter than the cap to be formed, endless driving means to engage and move the carrier relatively to the die to present the cap blank thereto, means to cause the cap blank to rotate in properly timed relation with respect to the die to cause the oversized cap blank to be properly formed and means to remove the cap from the carrier.

22. An apparatus of the class described comprising a stationary element, opposed rail members carried by said element and forming a trackway, a cap forming die carried by the stationary element, a cap blank carrier positioned in the trackway, means adjacent one end of the die to feed cap blanks to the carrier, endless driving means to engage and move the carrier with respect to the die, means to cause the rotation of the carrier to be timed in conformity with the configuration of the die, means to hold the carrier against axial movement and means to remove the cap from the carrier.

23. An apparatus of the class described comprising a stationary cap forming die, a cap blank carrier movable with respect to the die, means to feed cap blanks to the cap blank carrier, means engaging the cap blank carrier to move the same longitudinally of the die and to cause it to be rotated to present the cap blank to the die, means to guide the movement of the cap blank carrier, means to hold the cap blank properly seated upon the cap blank carrier, and means to remove caps from the carrier.

24. The combination of a cap forming machine including a stationary element and a moving cap blank carrier, of means to feed cap blanks to the carrier, comprising a cap blank supply chute, trip means mounted on the stationary element adjacent the lower end of the cap blank chute and extending into the path of movement of the carrier, a cap blank holding means arranged in the chute, operative connections between the trip means and the holding means to permit feeding of the cap blanks to the cap blank carrier upon engagement of the cap blank carrier with the trip means, and means to adjust the position of the trip means with respect to the path of movement of the cap blank carrier.

25. An apparatus of the class described comprising a stationary die, a blank carrier movable with respect to said stationary die and including a gear, a gear element engaging the gear on the carrier to move the same, means to drive said gear element and an overload clutch between the last named means and the gear element.

26. The combination with a cap forming machine, of means to form lug caps comprising a stationary die and a rectilinearly moving die, the moving die supporting the cap blank, lug forming blades spaced in the fixed die, and adjustable means to hold the lug forming blades in fixed position.

27. The combination with a cap forming machine, of means to form lug caps comprising a fixed die and a moving die, means to move the moving die with respect to the fixed die and to cause it to rotate during such movement, said moving die supporting the cap blank and having a smaller diameter than the internal diameter of the cap to be formed, lug forming blades spaced in the fixed die, said moving die including depressions in its periphery spaced to be aligned with the lug forming blades of the fixed die upon rotation of the moving die.

28. The combination with a cap forming machine having a moving cap blank carrier, of means associated therewith for removing a cap from the carrier upon the completion of the forming operation, said means comprising fixed members arranged in the path of movement of the carrier and spaced to permit the carrier to move therebetween, said members being upwardly inclined to lift the cap from the carrier during the movement of the carrier between the members.

29. The combination with a cap forming machine having a moving cap blank supporting carrier, of means associated therewith for feeding cap blanks to the carrier and means to cause the removal from the path of movement of the carrier of any cap blanks released by the cap feeding means but which are not properly positioned upon the carrier.

30. In a machine for forming caps, means to support a cap blank, a fixed die, means to move the cap blank supporting means to present a portion of the cap blank to the fixed die, means to rotate the cap blank supporting means during its movement, and spring-pressed means to hold the portion of the cap blank not presented to the fixed die in contact with the cap supporting means during the formation of the cap.

31. The method of simultaneously forming retaining means upon a plurality of caps for receptacles comprising simultaneously moving separate cap blanks along opposite sides of the orbital path of an endless carrier, rotating the respective cap blanks during their movement and causing them to contact with fixed die members.

32. The method of forming retaining means upon caps for receptacles comprising moving cap blanks rectilinearly along opposite sides of the center of the orbital path of an endless carrier, rotating the cap blanks during their movement and causing them to contact with a rectilinear and fixed die member.

33. An apparatus of the class described comprising an element including a trackway, an element positioned in the trackway, said trackway including means to support said last named element against axial movement, a forming die carried by one of the elements, the other element being adapted to support a blank, and means to move one of the elements with respect to the other to cause the blank to be presented to the die.

34. An apparatus of the class described comprising an element including a trackway, a forming die carried by the element, a blank carrier positioned in the trackway, said trackway including means to support the blank carrier against axial movement, and means to move the carrier in the trackway to present the blank carried thereby to the die.

35. An apparatus of the class described comprising an element including a trackway, a forming die carried by the element, a blank carrier positioned for movement in the trackway, said trackway including means to support the blank carrier against axial movement, and means to move the carrier in the trackway to present the blank carried thereby to the die and to cause the carrier to be rotated with respect to the die during such movement.

36. An apparatus of the class described comprising an element including a trackway, a forming die carried by the element, a blank carrier positioned for movement in the trackway, said trackway including means to support the blank carrier against axial movement, means to move the carrier to present the blank carried thereby to the die, and means fixed to the die to cause the carrier to be rotated during its movement.

37. An apparatus of the class described comprising an element including a trackway, a forming die carried by the element, a blank carrier positioned in the trackway, means to move the carrier in the trackway in one plane to present the blank to the die and to cause the carrier to be rotated with respect to the die during such movement, and means on said trackway to hold the carrier and blank carried thereby against movement out of the plane in which they are moved by the last named means.

38. An apparatus of the class described comprising a stationary element including an endless trackway, a forming die carried by the stationary element, blank carriers spaced about the trackway, said trackway including means to support the blank carriers against axial movement, and a driving element engaging the carriers to cause them to be moved in the trackway to present the blanks carried thereby to the die and to be rotated with respect to the die during such movement.

39. An apparatus of the class described comprising a stationary element including a trackway, a blank carrier positioned for movement in the trackway, said trackway including means to support the blank carrier against axial movement, a forming die carried by the stationary element on one side of the trackway, and means on the other side of the trackway to move the carrier to present the blank carried thereby to the die and to cause it to rotate with respect to the die.

40. An apparatus of the class described comprising an element including a trackway, a forming die carried by the element, a blank carrier positioned for movement in the trackway, said trackway including means to support the blank carrier against axial movement, and endless driving means engaging the carrier to move the same in the trackway to present the blank carried thereby to the die.

41. An apparatus of the class described comprising an element including a trackway, a forming die carried by the element, a blank carrier positioned for movement in the trackway, and endless driving means engaging the carrier to move the same in the trackway to present the blank carried thereby to the die.

42. An apparatus of the class described comprising an element including a trackway, a forming die carried by the element, a blank carrier positioned for movement in the trackway, and endless driving means engaging the carrier to move the same in the trackway to present the blank carried thereby to the die and to cause the carrier to be rotated with respect to the die during such movement.

43. An apparatus of the class described comprising an element including a trackway, a forming die carried by the element, a blank carrier positioned for movement in the trackway, endless driving means engaging the carrier to move the same to present the blank carried thereby to the die, and means fixed to the die to cause the carrier to be rotated during its movement.

44. An apparatus of the class described comprising an element including a trackway, a forming die carried by the element, a blank carrier positioned in the trackway, endless means engaging the carrier to move the same in the trackway in one plane to present the blank to the die and to cause the carrier to be rotated with respect to the die during such movement, and means to hold the carrier and blank carried thereby against movement out of the plane in which they are moved by the last named means.

45. An apparatus of the class described comprising a stationary element including an endless trackway, a forming die carried by the stationary element, blank carriers spaced about the trackway, and an endless driving element engaging the carriers to cause them to be moved in the trackway to present the blanks carried thereby to the die to be rotated with respect to the die during such movement.

46. An apparatus of the class described comprising a stationary element opposed rail members carried by said element and forming a trackway, a blank carrier positioned for movement in the trackway, a forming die carried by the stationary element on one side of the trackway, and endless driving means on the other side of the trackway engaging the carrier to move the same to present the blank carried thereby to the die and to cause it to rotate with respect to the die.

47. The method of forming retaining means upon caps for receptacles comprising moving cap blanks supported upon die heads rectilinearly along opposite sides of the center of the orbital path of an endless carrier, rotating the cap blanks and die heads during their movement and causing them to contact with a rectilinear and fixed die member.

48. An apparatus of the class described comprising an element, opposed rail members carried by said element and forming a trackway, a forming die carried by the element, a blank carrier movable in the trackway, and means to rotate the carrier during its movement in the trackway to present the blank carried thereby to the die.

49. An apparatus of the class described comprising an element, opposed rail members carried by said element and forming a trackway, a forming die carried by the element, a blank carrier positioned for movement in the trackway, means to move the carrier in the trackway to present the blank carried thereby to the die, and means to cause the carrier to be rotated during its movement.

50. An apparatus of the class described comprising an element including a trackway, a forming die carried by the element, a blank carrier positioned in the trackway, and a flexible driving element engaging the carrier to move the same to present the blank carried thereby to the forming die.

51. An apparatus of the class described comprising an element including a trackway, a forming die carried by the element, a blank carrier positioned in the trackway, and flexible driving means engaging the carrier to move the same in the trackway to present the blank carried thereby to the die and to cause the carrier to be rotated with respect to the die during such movement.

52. An apparatus of the class described comprising an element including a trackway, a forming die carried by the element, a blank carrier positioned for movement along the trackway, flexible driving means engaging the carrier to move the same to present the blank carried thereby to the die, and means fixed to the element to cause the carrier to be rotated during its movement.

53. An apparatus of the class described comprising an element including a trackway, a forming die carried by the element, a blank carrier positioned in the trackway, flexible driving means to move the carrier in the trackway in one plane to present the blank to the die and to cause the carrier to be rotated with respect to the die during such movement, and means to hold the carrier and blank carried thereby against movement out of the plane in which they are moved by the last named means.

54. An apparatus of the class described comprising an element including an endless trackway, a forming die carried by the element, blank carriers spaced about the trackway, and flexible driving means engaging the carriers to cause them to be moved in the trackway to present the blanks carried thereby to the die and to be rotated with respect to the die during such movement.

55. An apparatus of the class described comprising a stationary element including a trackway, a blank carrier positioned for movement along the trackway, a forming die carried by the stationary element on one side of the trackway, and flexible driving means on the other side of the trackway to move the carrier to present the blank carried thereby to the die and to cause it to rotate with respect to the die.

56. An apparatus of the class described comprising a fixed element including a trackway, a forming die carried by the fixed element, a blank carrier positioned in the trackway, and driving means to move the carrier in the trackway and cause it to be rotated to present the blank carried thereby to the forming die, the driving means cooperating with the trackway to hold the blank carrier properly aligned in the trackway.

57. An apparatus of the class described comprising a fixed element including a trackway, a forming die carried by the fixed element, a blank carrier positioned in the trackway, and flexible driving means to move the carrier in the trackway and cause it to be rotated to present the blank carried thereby to the forming die, the driving means cooperating with the trackway to hold the blank carrier properly aligned in the trackway.

58. An apparatus of the class described comprising a stationary element, a cap forming die carried by the stationary element, a driving member encircling the stationary element, and a blank carrier supported between the driving member and the stationary element and adapted to be moved with respect to the stationary element upon movement of the driving member.

59. An apparatus of the class described comprising a stationary element, a cap forming die carried by the stationary element, a flexible driving member encircling the stationary element, and a blank carrier supported between the driving member and the stationary element and adapted to be moved with respect to the stationary element upon movement of the driving member.

60. An apparatus of the class described comprising a stationary element, a cap forming die carried by the stationary element, an endless driving member encircling the stationary element, and a blank carrier supported between the driving member and the stationary element and adapted to be moved with respect to the stationary element upon movement of the driving member.

61. An apparatus of the class described comprising a fixed element, a forming die carried by the element, a driving member movable with respect to the fixed element and a blank carrier supported by the fixed element and driving member and adapted to be moved with respect to the fixed member upon movement of the driving member.

62. An apparatus of the class described comprising a fixed element, a forming die carried by the element, a flexible driving member movable with respect to the fixed element and a blank carrier supported by the fixed element and driving member and adapted to be moved with respect to the fixed element upon movement of the driving member.

63. An apparatus of the class described comprising a fixed element, a forming die carried by the element, an endless driving member movable with respect to the fixed element and a blank carrier supported by the fixed element and driving member and adapted to be moved with respect to the fixed element upon movement of the driving member.

64. An apparatus of the class described comprising a fixed element including a trackway, a forming die carried by the fixed element, a blank carrier positioned in the trackway, and endless driving means to move the carrier in the trackway and cause it to be rotated to present the blank carried thereby to the forming die, the driving means cooperating with the trackway to hold the blank carrier properly aligned in the trackway.

65. An apparatus of the class described comprising a fixed element, a forming die carried by the element, an endless driving member movable with respect to the fixed element, and a blank carrier supported by the fixed element and driving member and adapted to be moved with respect to the fixed element upon movement of the driving member to present the blank upon the carrier to the die.

66. An apparatus of the class described comprising a fixed element including a trackway, a blank carrier positioned for movement along the trackway, endless driving means to move the carrier in the trackway, and a forming die adapted to form the blank to a predetermined shape upon movement of the blank carrier with respect to the fixed element.

67. An apparatus of the class described comprising a fixed element including a trackway, a blank carrier positioned for movement along the trackway, endless flexible driving means to move the carrier in the trackway, and a forming die adapted to form the blank to a predetermined shape upon movement of the blank carrier with respect to the fixed element.

68. An apparatus of the class described comprising a fixed element, opposed rail members carried by said element and forming a trackway, a blank carrier positioned for movement along the trackway, means to move the carrier in the trackway and a forming die adapted to form the blank to a predetermined shape upon movement of the blank carrier with respect to the fixed element.

69. An apparatus of the class described comprising a fixed element, a forming die carried by the fixed element, a blank carrier, and driving means engaging the carrier and cooperating with the fixed element to support the carrier and cause it to be rotated to present the blank carried thereby to the forming die.

70. An apparatus of the class described comprising a fixed element, a forming die carried by the fixed element, a blank carrier, and driving means having a gear connection with the carrier and cooperating with the fixed element to support the carrier and cause it to be rotated to present the blank carried thereby to the forming die.

71. An apparatus of the class described comprising a stationary element, a cap forming die carried by the stationary element, opposed rail members carried by said stationary element and forming a trackway, cap blank carriers spaced about the stationary element in the trackway, said spaced rail members being adjustable with respect to each other.

72. An apparatus of the class described comprising a fixed element, a forming die carried by the element, blank carriers spaced about said fixed element, and flexible means encircling said element and carriers to hold the carriers spaced about said element.

FRANK S. BELL.